Sept. 16, 1941.    R. E. REASON    2,256,103
OPTICAL PROJECTING APPARATUS
Original Filed June 1, 1938    5 Sheets-Sheet 2
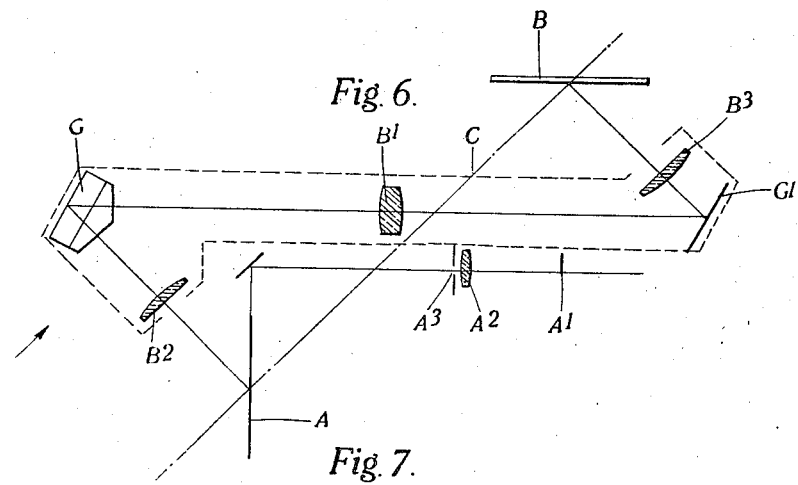
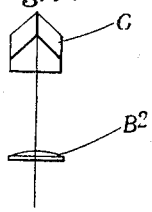
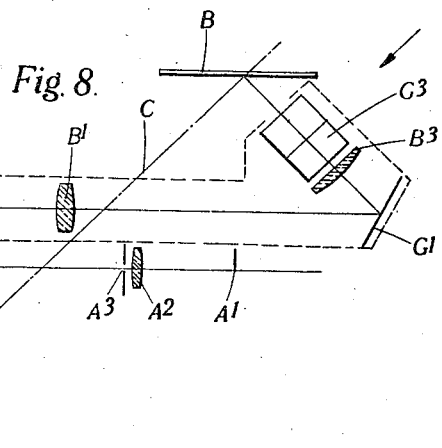
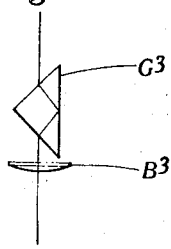
Inventor
Richard Edmund Reason
by
Arthur L. Reed
his Attorney Sept. 16, 1941.  R. E. REASON  2,256,103
OPTICAL PROJECTING APPARATUS
Original Filed June 1, 1938   5 Sheets-Sheet 3

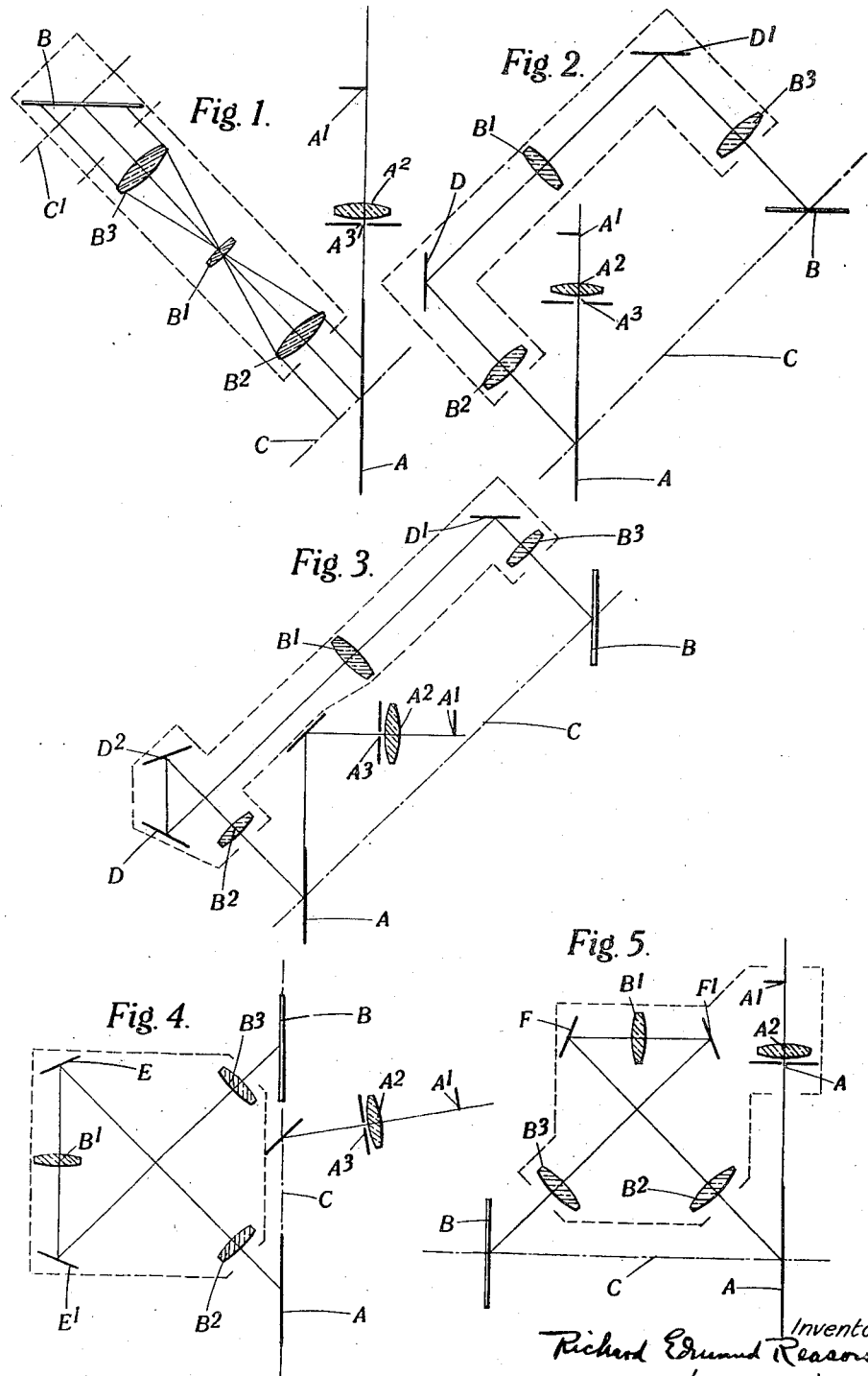

Inventor
Richard Edmund Reason
by
Arthur L. Kurt
his Attorney

Sept. 16, 1941.   R. E. REASON   2,256,103
OPTICAL PROJECTING APPARATUS
Original Filed June 1, 1938   5 Sheets-Sheet 4

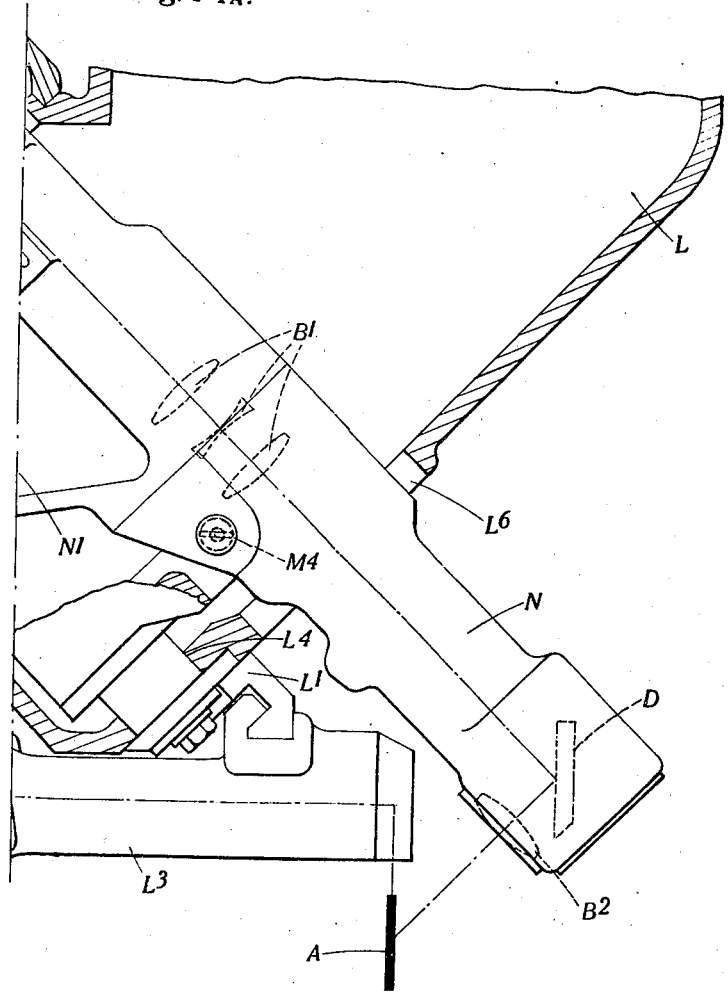

Patented Sept. 16, 1941

2,256,103

UNITED STATES PATENT OFFICE 2,256,103

OPTICAL PROJECTING APPARATUS

Richard Edmund Reason, Leicester, England, assignor to Kapella Limited, Leicester, England, a company of Great Britain Original application June 1, 1938, Serial No. 211,231. Divided and this application June 4, 1940, Serial No. 338,691. In Great Britain September 24, 1937

14 Claims. (Cl. 88—24)

This application is divisional from United States of America patent application Serial No. 211,231, filed June 1, 1938.

The invention relates to optical apparatus for projecting images of plane profiles and more especially (though not exclusively) plane section profiles of manufactured articles or of appliances used in their manufacture, as for example for effecting precision measurements of screwthreads or hobs or thread gauges. In the projection of such profiles difficulty often arises from the fact that it is impossible to see the whole profile from any one view-point owing to obstruction of the view by other parts of the object whose profile is to be examined. Thus, for example in the case of gear teeth, especially undercut teeth, it is often impossible to view simultaneously both flanks of a tooth, but it will be clear that in precision measurement the exact relationship between opposite flanks of a tooth may be of considerable importance.

The present invention has for its object to provide an optical projection apparatus by means of which images of separate parts of a plane profile obtained by projection from separate viewpoints can be accurately correlated with one another.

Further objects of the invention will be apparent from the following description of the accompanying drawings, which illustrate somewhat diagrammatically a number of alternative constructions according to the invention. In these drawings—

Figure 10:
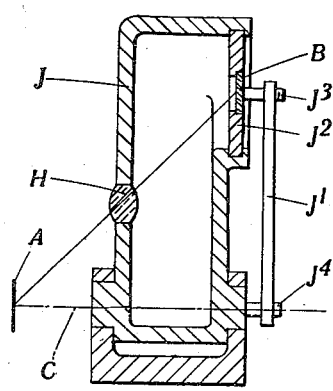
Figure 11:
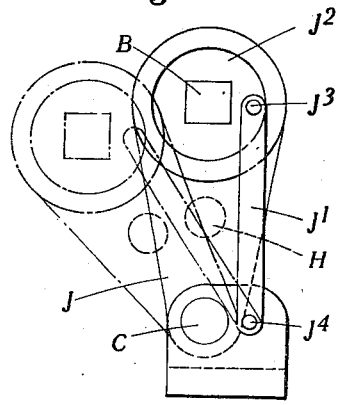
Figure 12:
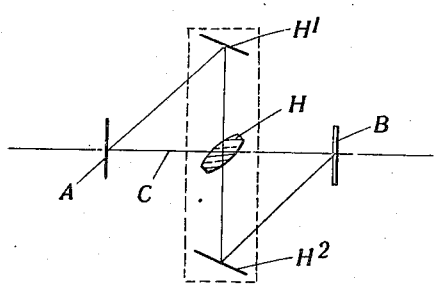
Figure 13:
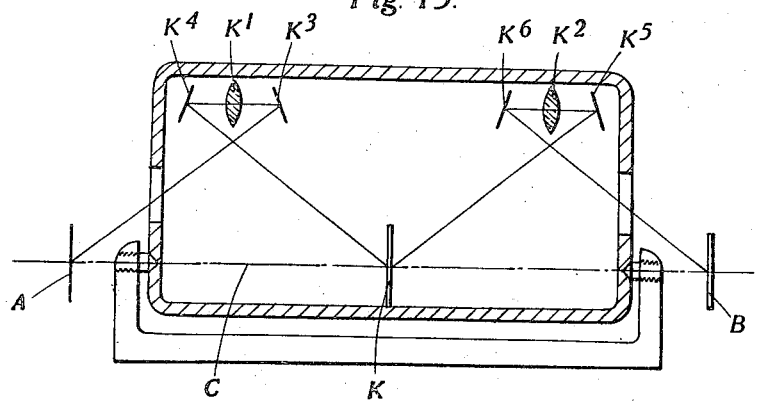
Figure 14:
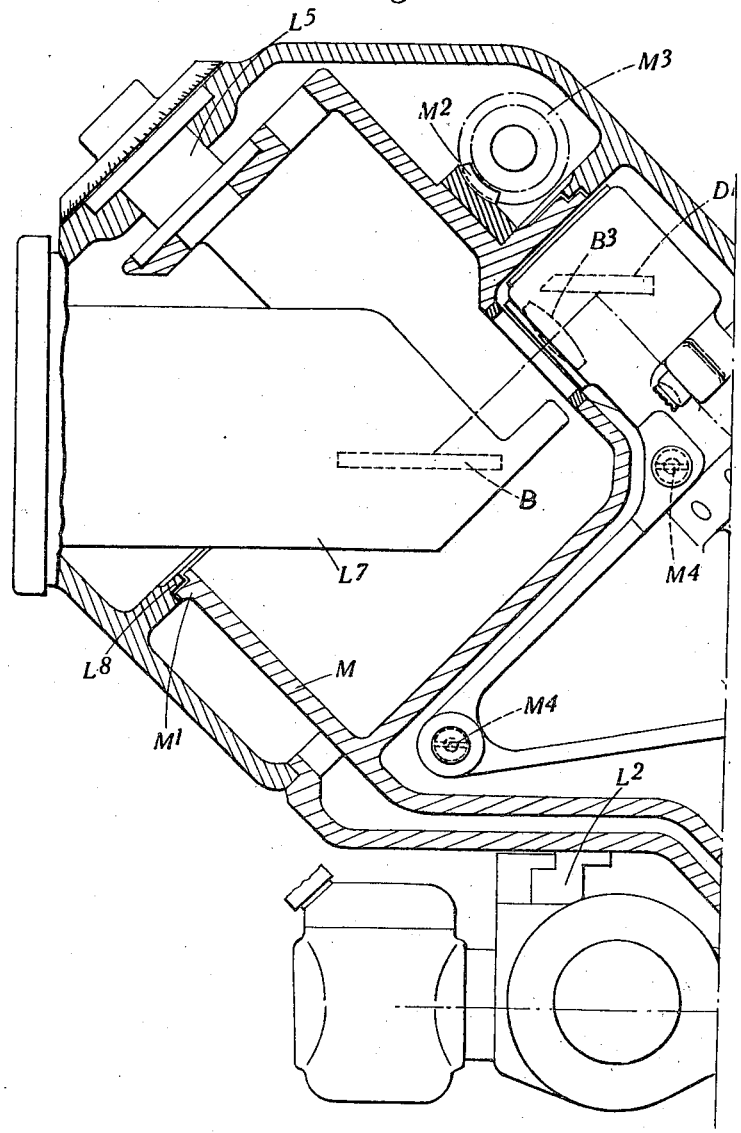

Figures 1-9 show seven alternative arrangements each incorporating the oblique projecting lens system forming the subject of United States of America patent application Serial No. 279,253 (also divisional from application Serial No. 211,231 above mentioned), Figures 7 and 9 respectively being side views of parts of the arrangements of Figures 6 and 8 in the direction of the arrows shown, Figures 10-13 show three further arrangements, Figure 10 being a section on the line 10—10 of Figure 11, and Figures 14 and 14a are sectional views of a preferred practical construction embodying the arrangement shown diagrammatically in Figure 2.

These arrangements will, for convenience, be described with reference to their use in apparatus of the kind described in United States of America application Serial No. 211,231 from which the present application is divided, for testing or measuring plane section profiles of objects such, for example, as screwthreads or gear wheels. Such apparatus broadly comprises an illuminating device for directing on to the object a beam of light bounded (at least on one side) by a plane, and means whereby the diffused light from the surface of the object is utilised for the optical projection of an image of the section of the profile in which the object is cut by such bounding plane. The illuminating device preferably acts to focus one or more knife edges on the surface of the object so as to illuminate thereon an area having a sharply defined edge constituting the section profile. Owing to obstruction by other parts of the object, it is usually necessary to project the image of the section profile in an oblique direction, and the projecting device is therefore so arranged as to give a rectified image free from distortion due to the oblique projection.

It will be appreciated, however, that it will in practice often happen (as for example in the case of undercut teeth) that the shape of the object renders it impossible to project an image of the complete section profile from any one viewpoint. With the projecting apparatus according to the invention, however, it becomes practicable to project images of parts of the profile from different viewpoints and to correlate such images properly with one another. The following arrangements according to the invention will be described with reference to the photographic reception of the images in the image plane, since this is in practice much more convenient for measurement or testing purposes than projection on to a screen.

In the arrangements of Figures 1-9, the section plane is indicated at A and a simple form of illuminating device is shown comprising a knife edge $A^1$ focussed approximately on the surface of the object by means of an objective $A^2$ provided with a small aperture $A^3$ which may, if desired, be in the form of a narrow slit. The projecting lens system is of the kind described in United States of America application Serial No. 279,253 above mentioned, giving a rectified image free from distortion due to the oblique projection. The lens system acts to collimate the principal rays in the object and image spaces and comprises a projecting lens $B^1$ disposed between two collimating lenses $B^2B^3$ whose principal focal points are respectively coincident with the nodal points of the projecting lens $B^1$. Each collimating lens is corrected for spherical aberration with respect to the corresponding nodal point of the projecting lens and fulfills the sine condition within the angle subtended by the projecting lens, and the projecting lens may be corrected to compensate for the other aberrations introduced by the collimating lenses. The lens system is preferably symmetrical and gives unit magnification, although some departure from unit magnification can be tolerated by drawing on the depth of focus. The system is such that the object and image planes are equally inclined to the optical axis, the object plane coinciding with the section plane A, whilst a photographic plate B is disposed in the image plane.

In the arrangement of Figure 1, the complete projecting system $B^1B^2B^3$, together with the photographic plate B, is mounted for rotation within suitable angular limits about an axis, indicated in chain line at C, suitably inclined to the direction of view. Conveniently, as in the example illustrated, the axis C is at right angles to the optical axis and at 45° to the section plane A and passes through the intersection of the optical axis with the section plane. In the normal position of the apparatus, as shown, the section plane, the image plane and the plane containing the optical axis and the axis of rotation are mutually perpendicular, so that in this position the image plane is inclined at 45° to the optical axis. In order, however, to maintain the image stationary and sharply focussed on the plate B during the rotation, it is necessary for the plate itself to be rotated about a secondary axis relatively to the optical axis during the rotation of the optical axis about the main axis of rotation C. This can be achieved by employing for this moving secondary axis a line $C^1$ perpendicular to the optical axis through the point of intersection thereof with the image plane, the rate of rotation of the plate about the axis $C^1$ (relatively to the optical axis) being made equal to that of the system about the main axis C by means for example of spur gearing or cams, so as to ensure that the photographic plate and the section plane remain equally inclined to the optical axis. The image in this arrangement is an inverted image.

With this arrangement in practice the projecting apparatus is first adjusted to a position in which one part of the section profile can be clearly viewed and the plate is exposed to take a photograph of such part. The apparatus is then adjusted to a new position in which the next part of the profile can be viewed and the same plate is again exposed, further exposures being made, as may be necessary, to obtain a composite photograph of the complete profile.

This arrangement can be modified by employing a main axis of rotation not at right angles to the optical axis. In this case the secondary axis will be coplanar with the main axis and will be inclined to the optical axis at the same angle as the main axis. Thus when the main axis is at right angles to the section plane, the secondary axis will be at right angles to the plate, and when the main axis lies in the section plane the secondary axis will lie in the image plane.

It will usually be more convenient, however, to employ a stationary photographic plate, and this can be achieved in a variety of ways by incorporating reflecting devices into the rotating optical system.

In one such arrangement, shown in Figure 2, the photographic plate B is fixed at right angles to the section plane A and the axis of rotation C passes through the plate and the section plane at 45° to each. The optical system includes, in addition to the three lenses $B^1B^2B^3$, two plane reflectors $DD^1$ each of which deflects the optical axis through a right angle, so that the optical axis intersects the section plane and the plate in the same points as the axis of rotation. The image is again inverted.

This arrangement may be modified, if desired, as shown in Figure 3 by turning the plate B through a right angle so that it is parallel to the section plane A, and adding an adidtional reflector $D^2$ at one of the corners. In this way an image erect in the direction parallel to the plane of the drawing and inverted in a direction at right angles thereto is obtained to suit the relative directions of rotation of the section plane and plate with respect to the optical axis.

In another arrangement, shown in Figure 4, the plate B is coplanar with the section plane A and the axis of rotation C also lies in such plane. The optical axis of the projecting lens system $B^1B^2B^3$ leaves the section plane at 45°, is deflected by a reflector E back again parallel to such plane, and is deflected again by another reflector $E^1$ to meet the plate at 45°. The image in this case is completely inverted.

In the arrangement of Figure 5, the plate B is parallel to the section plane A with the axis of rotation C perpendicular to both, the optical axis of the lens system intersecting both planes at 45° with two intermediate reflections at F and $F^1$. The image is again completely inverted.

In all these arrangements it has been assumed that the illuminating device will adequately illuminate the whole section profile, and it will be realised that in some instances more than one illuminating device or alternatively a movable illuminating device will be required to illuminate the particular part of the profile being projected. The arrangement of Figure 5 has the advantage that a single illuminating device can be employed which is movable with the projecting device, since the axis of rotation C is perpendicular to the section plane.

The requirements as to erection or inversion of the image depend on the relative directions of rotation of the section plane and the plate with respect to the optical axis, and the arrangements other than those above mentioned may be employed. Since it is more convenient for rectifying purposes for the lens system itself to give an inverted image, the requisite further inversions in individual cases are provided by the reflectors, and in some instances special reflectors such as Dove's prisms or roof prisms are required.

Thus in the case (shown in Figures 6 and 7) of a stationary plate B perpendicular to the section plane A with the axis of rotation C at 45° to both, the optical axis of the lens system may leave the section plane at right angles to the axis of rotation C and after crossing such axis may approach the plate at right angles to the axis. In this case it is necessary for the image to be inverted in a direction parallel to the plane of the drawing and erect in a direction at right angles thereto. This is achieved by providing a roof prism G at one of the corners and a plane reflector $G^1$ at the other corner. A similar result can also be obtained as shown in Figures 8 and 9 by replacing the roof prism G by a plane reflector $G^2$ and inserting a Dove's prism $G^3$ at a convenient point in the ray path.

In the arrangements of Figures 1 to 9 the desired rectification of the image has been obtained by means of the lens system of United States of America patent application Serial No. 279,253 above mentioned, but other rectifying arrangements may be employed, if desired.

Thus Figures 10 and 11 show an arrangement in which a wide angle lens H is employed, the section plane A and the photographic plate B being parallel to one another and to the nodal plane of the lens. In this case the lens H and the plate B are mounted on a frame J rotatable about an axis C at right angles to the section plane. In order to correlate the partial images with one another in this case it is necessary for the plate B, during its rotational movement about the axis C, to remain in the same orientation in its plane. This can be achieved by a simple parallel link mechanism, consisting in the example illustrated of a link $J^1$ connecting a point $J^3$ on the plate carrier $J^2$ (which is itself rotatable in the frame J) to a fixed point $J^4$, the dimensions of the parts being such that the link $J^1$ always remains parallel to the line joining the main axis of rotation C with the secondary axis of rotation of the plate carrier $J^2$.

Figure 12 shows an alternative arrangement using a wide angle lens H, wherein by the use of reflectors $H^1$, $H^2$, which are rotatable with the lens H about an axis C intersecting the section plane A and the plate B at right angles in points which are images of one another, it becomes possible to employ a stationary plate.

Figure 13 illustrates a further alternative arrangement employing a rectifying projecting system having two projecting lenses and a diffusing screen, a focussed but distorted image produced on the diffusing screen by oblique projection through the first lens being reprojected by the second lens at such an angle as to correct for the distortion. In general, the distortion will be properly corrected if the direction of reprojection and the final image plane are respectively mirror images with respect to the diffusing screen of the original direction of projection and the object plane. In the example illustrated the section plane A, the plate B and the intermediate diffusing screen K are all parallel to one another. The two projecting lenses $K^1K^2$ and two pairs of reflectors $K^3K^4$ and $K^5K^6$ associated therewith are all rotatable as a unit about an axis of rotation C which intersects the section plane A, the diffusing screen K and the plate B at right angles in points which are images of one another. This arrangement permits the use of a stationary plate, whilst the diffusing screen may be stationary or may rotate with the lenses.

Figures 14 and 14A show a preferred practical construction incorporating the arrangement diagrammatically illustrated in Figure 2. The apparatus is mounted in a casing L, which carries on its underside two guides $L^1L^2$ into which a detachable illuminating unit $L^3$ can be fitted. The illuminating unit is preferably of the kind described in United States of America patent application Serial No. 211,231 above mentioned, and acts to define the section plane indicated at A. The casing L is provided in its end walls with bearings $L^4L^5$ for a rotor M, the axis of rotation of which intersects the section plane A at 45°. Adjacent to the lower bearing $L^4$ the casing has an arcuate opening $L^6$, through which projects the end of a projection unit N, and in order to prevent stray light from this opening from passing into the upper part of the casing, which accommodates a plate box $L^7$ containing the photographic plate B, the casing has a stepped flange $L^8$ which lies in close proximity to a rib $M^1$ on the rotor M. The rotor carries a segmental worm rack $M^2$, with which engages a worm $M^3$ operated by a handwheel outside the casing.

The lower portion of the rotor M has a relatively narrow hollow form for supporting the projection unit N, which for convenience is made separate from the rotor, and the mounting of the unit in the rotor is such as to enable its position to be adjusted with a high degree of accuracy. The unit N is of generally tubular form with a downwardly projecting web $N^1$, which enters the hollow lower portion of the rotor and is secured in position therein by means of a number of screws (some of which are indicated at $M^4$) abutting against suitable facings on the web or on the tubular portion of the unit. This tubular portion contains centrally within it the projecting lens $B^1$ and at its ends the two reflectors $DD^1$ and the two collimating lenses $B^2B^3$ (arranged as in Figure 2), the collimating lenses being fitted in lateral openings in the wall of the unit. The optical axis of the lower collimating lens $B^2$ is at right angles to the axis of rotation of the rotor M and passes through its point of intersection with the section plane A, whilst the optical axis of the projecting lens $B^1$ is parallel to the axis of rotation and that of the upper collimating lens $B^3$ intersects the axis of rotation at right angles in the image plane. The photographic plate B is carried in a plate slide which can be inserted into the plate box $L^7$ mounted in the upper part of the casing, the arrangement being such that the plate occupies the proper position in the image plane at right angles to the section plane A.

It will be appreciated that the above arrangements have been described by way of example only and that many other variants are possible within the scope of the invention. Further although described primarily with reference to its application to the testing or measuring apparatus of the United States of America patent application Serial No. 211,231 above mentioned, the invention is not limited thereto and is generally applicable to plane profile projection where viewing from more than one direction is called for to obtain an image of the complete profile. Again it is not essential to the invention to receive the image photographically, and successive projection of the partial images on to a screen may in some cases adequately serve the purpose.

What I claim as my invention and desire to secure by Letters Patent is:

1. Optical apparatus for projecting an image of a plane profile, comprising an optical system arranged to produce a rectified image free from distortion due to oblique projection, means for rotating such system about an axis inclined to the direction in which the profile is viewed, and means for maintaining the correct angular relationship between the optical axis of the system and the image and object planes whereby images of the profile obtained in different rotational positions of the optical system will be properly correlated with one another in the image plane.

2. Optical projection apparatus as claimed in claim 1, in which the optical system is arranged to give unit magnification.

3. Optical projection apparatus as claimed in claim 1, in which the optical system includes a system of lenses so arranged as to collimate the principal rays in the object and image spaces.

4. Optical projection apparatus as claimed in claim 1, in which the optical system includes a projecting lens symmetrically disposed between two collimating lenses and is arranged to give unit magnification and to collimate the principal rays in the object and image spaces.

5. Optical projection apparatus as claimed in claim 1, in which the image plane is rotated with the optical system and is simultaneously rotated relatively thereto.

6. Optical projection apparatus as claimed in claim 1, in which the image plane is rotated with the optical system and is simultaneously rotated relatively thereto about an axis which cuts the image plane in a point which is the image of the point of intersection of the main axis of rotation and the object plane.

7. Optical apparatus for projecting an image of a plane profile, comprising an optical system viewing the profile obliquely and arranged to produce a rectified image of the profile free from distortion due to oblique projection, reflecting devices associated with such system, a stationary image-receiving surface, and means for rotating the optical system and the reflecting devices about an axis which intersects the image plane of the system at the image of the point in which it intersects the object plane and is equally inclined to the object and image planes and to the parts of the optical axis of the system adjacent to such points of intersection, whereby the image plane is maintained coincident with the stationary image receiving surface.

8. Optical projection apparatus as claimed in claim 7, in which the image plane is disposed at right angles to the object plane and the axis of rotation cuts each of such planes at 45°.

9. Optical projection apparatus as claimed in claim 7, in which the image and object planes are parallel to one another and at right angles to the axis of rotation.

10. Optical projection apparatus as claimed in claim 1, in which the partial images of the profile are received photographically in the image plane by exposure in the different rotational positions of the optical system, whereby a composite photograph of the whole profile is obtained with the parts in the correct relative positions.

11. Optical projection apparatus as claimed in claim 1, in which the optical system comprises a wide angle lens whose nodal planes are inclined to the principal rays at the same angle as the image and object planes.

12. Optical apparatus for projecting an image of a plane profile in a direction oblique to the profile plane, comprising a wide angle projecting lens whose nodal planes are parallel to the profile plane and the image plane, an image-receiving surface located in the image plane for receiving the image of the profile, means for rotating the lens and the image-receiving surface about an axis perpendicular to the profile plane, and means for simultaneously rotating the image plane relatively to the lens about a secondary axis which is perpendicular to the image plane and cuts such plane in a point which is the image of the point of intersection of the main axis of rotation and the profile plane, the two speeds of rotation being equal and opposite.

13. Optical projection apparatus as claimed in claim 7, in which the optical system comprises a wide angle lens whose nodal planes are inclined to the optical axis of the system at the same angle as the image and object planes.

14. Optical apparatus for projecting an image of a plane profile in a direction oblique to the profile plane, comprising a wide angle projecting lens, two reflectors so disposed one on either side of the lens that the optical axis of the system after leaving the profile plane is deflected through the lens and is then deflected again parallel to its original direction towards the image plane, the profile and image planes and the nodal planes of the lens all being equally inclined to such optical axis, and means for rotating the lens and the reflectors about an axis which intersects the profile and image planes at right angles in points which are images of one another with respect to the optical system comprising the lens and reflectors.

RICHARD EDMUND REASON.